Sept. 7, 1954 C. M. CRAIG ET AL 2,688,233
POST DRIVER
Filed Aug. 14, 1953 2 Sheets-Sheet 1

INVENTORS
Clarence M. Craig,
Henry B. Craig,
BY
McMorrow, Berman & Davidson
ATTORNEYS

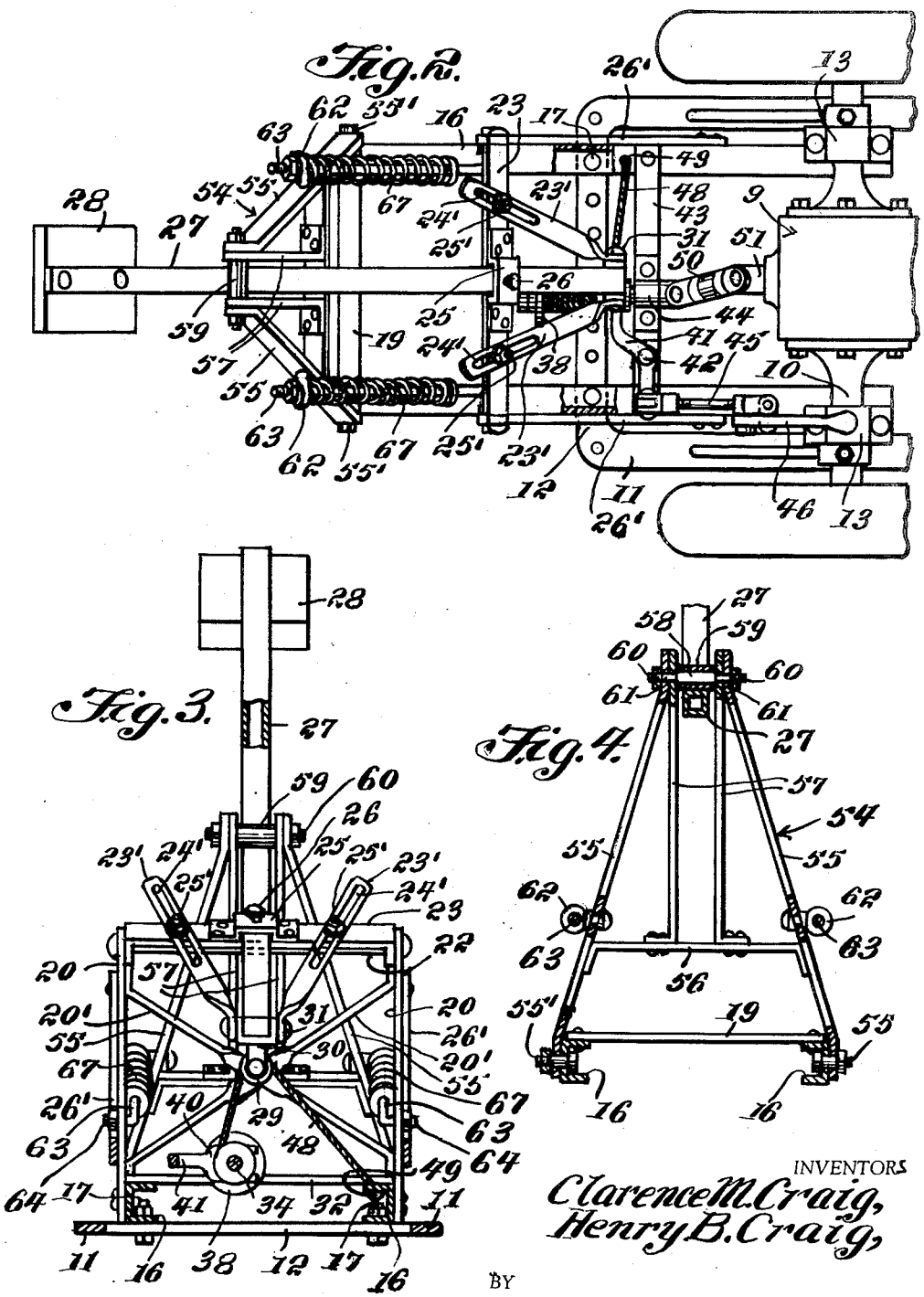

Patented Sept. 7, 1954

2,688,233

UNITED STATES PATENT OFFICE 2,688,233

POST DRIVER

Clarence M. Craig and Henry B. Craig,
Green Castle, Mo.

Application August 14, 1953, Serial No. 374,234

6 Claims. (Cl. 61—75)

This invention relates to improvements in post driving apparatus, and more particularly to an improved post driver adapted to be removably mounted on the draw-bar and rear axle structure of a conventional tractor and operated from a power take-off of the tractor under the control of the operator of the tractor; and a primary object of the invention is to provide a more efficient and practical device of this kind which is simple and inexpensive in construction and is easily installed and operated, and is especially but not exclusively suited to the driving of fence posts, without any or with a minimum of disturbance of adjacent fence structure.

Other important objects and advantageous features of the invention will be apparent from the following description and the accompanying drawings wherein, for purposes of illustration only, a specific form of the invention is set forth in detail.

In the drawings:

Figure 2 is a top plan view of Figure 1, with parts broken away;

Figure 3 is a transverse vertical section taken on the line 3—3 of Figure 1;

Figure 4 is a transverse vertical section taken on the line 4—4 of Figure 1;

Figure 1:
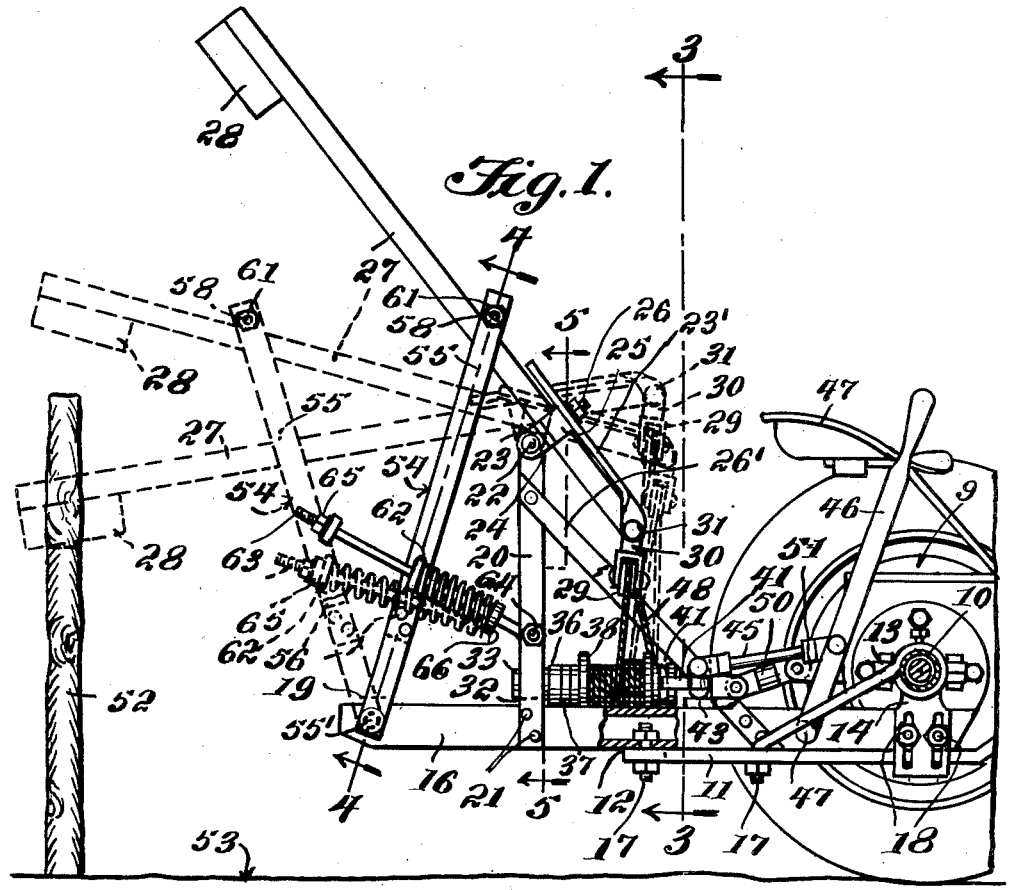
Figure 1 is a right-hand side elevation, partly in vertical longitudinal section, showing a post driver in accordance with the present invention mounted on the draw-bar and rear axle structure of a tractor, showing the hammer or driver arm in different stages of operation relative to a fence post.

Referring to the drawings in detail, wherein like numerals designate like parts throughout the several views, the numeral 9 generally designates a conventional form of farm tractor having a rear axle structure, including an axle housing 10, and a generally U-shaped draw-bar structure, including side members 11, 11 and a rear cross member 12 extending between the side members 11, 11 and clamp members 13, 13 embracing the axle housing 10 and having portions 14, 14 depending therefrom at the inboard sides of the draw-bar structure side members 11, 11, as seen in Figures 1 and 2 of the drawings.

Figures 5, 6:
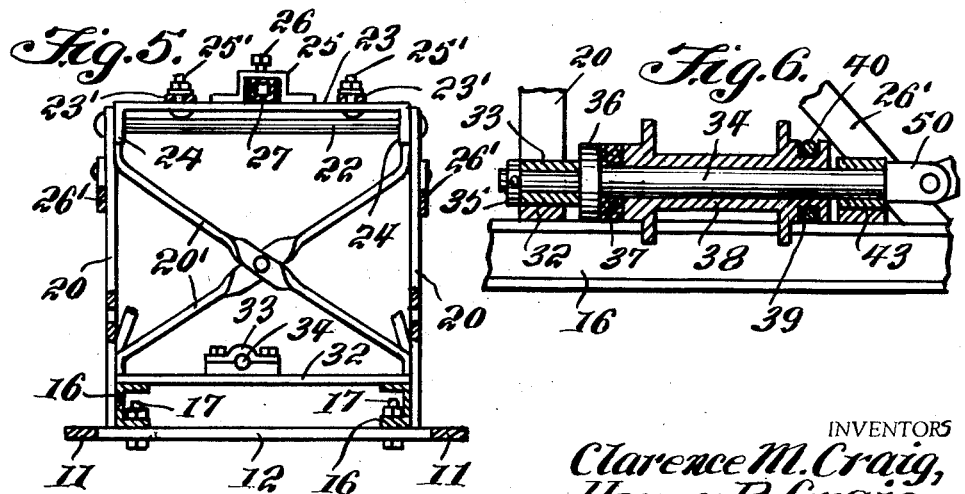
Figure 5 is a transverse vertical section taken on the line 5—5 of Figure 1.
Figure 6 is an enlarged fragmentary longitudinal section taken through the cable drum or winch and its clutch mechanism.

The illustrated post driver, generally designated 15, is shown as an attachment for the tractor 9 and comprises a frame which includes laterally spaced longitudinal and horizontal side members 16, 16 preferably of channel cross section, which rest at a point intermediate their ends upon the draw-bar rear cross member 12, and are bolted thereto as indicated at 17, 17 in Figures 1, 3 and 5 of the drawings. Forward end portions of the driver frame side members 16, 16 are positioned beneath the tractor rear axle housing 10 and are bolted to the depending portions 14, 14 of the clamps 13, 13, as indicated at 18, 18.

As shown in Figures 1 and 2, the driver frame side members 16, 16 extend rearwardly beyond the rear draw-bar cross member 12 for a major portion of their length and are at their rear ends rigidly spaced and connected by a rear cross member 19. At a point spaced from the draw-bar rear cross member 12 and the driver frame rear cross member 19 standards 20, 20 are fixed at their lower ends to the outboard sides of the driver frame side members 16, 16, as indicated at 21, 21 in Figures 1 and 3, and rise perpendicularly from the driver frame side members 16, 16, and are traversed at their upper ends by a rock shaft or pivot bolt 22.

Crossed braces 20', 20' extend between and are fixedly secured to upper and lower portions of the standards 20, as particularly well shown in Figures 3 and 5, to brace the standards and render them more rigid. Diagonal brace bars 26' are secured at one end to the frame side members 16 and at their other ends to upper parts of the standards 20 at the outer sides of the standards 20.

A cradle or yoke 23 extends along the top of the rock shaft 22 and has depending ears 24, 24 which are journaled on the rock shaft 22 and engage the inboard sides of the standards 20, 20. A strap clamp 25 is fixed to the middle of the upper side of the yoke 23 and is provided with a clamping screw 26.

A driving or hammer arm 27, preferably in the form of a hollow square bar, is positioned through the clamp 25, and is held in adjusted position therein by the clamping screw 26. As shown in Figures 1 and 2 the hammer arm 27 extends longitudinally of the driver frame and and has substantially more of its length behind the yoke 23 and rock shaft 22 than in front thereof, so as to be over-balanced in a rearward and downward direction. A weighted driving or hammer head 28 is fixed to the underside of the rear end of the arm 27. A pulley 29 is mounted by a clevis 30 pivoted on a transverse axis, as indicated at 31, to the rearward end of the hammer arm 27 in a pendant position.

Brace bars 23' and 23' are secured at one end to the opposite ends of the clevis 30 by the headed ends of the pivot 31. Forward end portions of the brace bars 23', 23' have longitudinal slots 24', 24' and overlie the yoke 23. The yoke 23 has bolts 25', 25' which extend therethrough and engage through the slots 24', 24' and secure the brace bars 23', 23' in the desired adjusted and fixed relation to the yoke 23.

A first intermediate cross member 32 is fixed on top of the driver frame side members 16 in the region of the standards 20, 21 and a bearing 33 is fixed on the cross member 32. The rear end of a winch or cable drum shaft 34 is journaled in the bearing 33, with a stop collar 35 fixed to the shaft 34 and engaging the rear end of the bearing 33, as shown in Figure 6. Fixed on the shaft 34 and engaging the forward end of the bearing 33 is a clutch face 36 which is opposed to a clutch facing 37 fixed on the adjacent end of a flanged cable drum 38 which is slidably journaled on the shaft 34. The forward end of the drum 38 has an annular groove 39 in which is freely engaged a clutch shifting fork 40 having a lever arm 41, pivoted as indicated at 42 on a second intermediate cross member 43 which is fixed on the tops of the driver frame side members 16, 16 at the forward end of the cable drum 38. A front bearing 44 is fixed on the second cross member 43 and journals the forward end of the shaft 34. The front bearing 44 is spaced sufficiently forwardly from the clutch face 36 to permit the drum 38 to be moved forwardly along the shaft 34 by the clutch fork 40 and free the clutch facing 37 from driving engagement with the clutch face. Operating linkage 45 extends forwardly from the clutch lever arm 41 and is connected to a hand lever 46 pivoted on a driver frame side member 16 alongside of the operator's seat 47 of the tractor 9.

A cable 48 has one end anchored to a driver frame side member 16 as indicated at 49, and has its intermediate portion trained over the hammer arm pulley 29, with the other end portion of the cable wound upon the cable drum 38. The front end of the drum shaft 34 is connected by a universal joint 50 with a rear power take-off 51 of the tractor 9. Because of this arrangement, the power take-off being in operation, an operator occupying the tractor seat 47 can selectively engage and disengage the clutch facing 37 from the clutch face, and wind and unwind the cable 48 on the drum 38, so as to swing the hammer arm 27 on the rock shaft 22 upwardly and free it to fall downwardly to drivingly engage its hammer head 28 with such as a fence post 52 for driving the post into the ground 53.

In accordance with the present invention the action of the force of gravity in the fall of the hammer arm 27 is substantially supplemented and enhanced by spring-actuated driving mechanism, portions of which also serve to guide the hammer arm and confine it to a predetermined path, so that more accurate and uniform post driving is obtained.

The spring actuated driving and guiding mechanism includes an upright, forwardly and rearwardly swingable frame 54 having upwardly converging vertical side members 55, 55 which are, as indicated at 55', 55', pivoted at their lower ends to the outboard sides of the driver frame side members 16, 16 at the rear ends of the members 16, 16. A horizontal cross member 56 is spaced upwardly from the lower ends of the side members 55 and is secured at its ends to the side members 55, and a pair of spaced parallel vertical guide members 57, 57 have their lower ends fixed to the cross member 56. The upper ends of the vertical members 57, 57 are on a level with the upper ends of the vertical side members 55, 55 and are located at the inboard sides thereof. A roller shaft 58 extends between the upper ends of the members 57, 57 and carries the members 55, 55 and 57, 57 and are secured with nuts 61, 61, as shown in Figure 4. The roller 59 rides upon the top of the hammer arm 27 with the hammer arm confined between the vertical guide members 57, 57.

Fixed on the outboard sides of the converging vertical side members 55, 55 at a point above the cross member 56 are eyes 62, 62 through which extend the rear ends of spring carrying rods 63, 63, whose forward ends are pivoted on horizontal axes on the inboard sides of the standards 20, 20 at points below the level of the eyes 62, 62, as indicated at 64, 64. Adjustable stop nuts 65, 65 are on the rear ends of the rods 63, 63 and engage the rear sides of the eyes 62, 62. Circumposed on the rods 63, 63 between the eyes 62, 62 and fixed stops 66, 66 on the rods 63, 63 are helical driving springs 67, 67.

When the cable 48 is wound onto the drum 38 the rear end portion of the hammer arm 27 is swung upwardly and in so doing cams the swingable frame forwardly and this compresses and tensions the springs 67, 67 as indicated in full lines in Figure 1 of the drawings. With the parts in this full line or cocked position, operation of the hand lever 46 in the proper direction will disengage the drum clutch mechanism and free the drum 38 to rotate freely on the shaft 34, thereby permitting the springs 67, 67 to expand and thereby drive the hammer arm rearwardly and downwardly with speed and force for driving a post into the ground. A subsequent driving stroke of the hammer arm 27 is prepared for by re-engaging the drum clutch mechanism, the tractor power take-off being in operation, and returning the hammer arm 27 to the elevated full line position shown in Figure 1, so as to tension the springs 67, 67.

What is claimed is:

1. In a post driver, a horizontal frame, a hammer arm extending lengthwise of said frame, said hammer arm having a hammer head on one end and having another end, standard means pivotally mounting said hammer arm on said frame to swing said one end downwardly on a horizontal axis to a driving position from an inoperative position in which said one end is elevated, elevating means on said frame and connected to said other end of said hammer arm for swinging said hammer arm from its driving position to its inoperative position, driving spring means acting between said hammer arm and a portion on said frame, said driving spring means being arranged to be tensioned by movement of said hammer arm from its driving position to its inoperative position, and means for connecting said elevating means to a power take-off for actuating said elevating means and for disconnecting said elevating means from a power take-off so as to free said driving spring means to swing said hammer arm from its inoperative position to its driving position.

2. In a post driver, a horizontal frame, a hammer arm extending lengthwise of said frame, said hammer arm having a hammer head on one end and having another end, standard means pivotally mounting said hammer arm on said frame to swing said one end downwardly on a horizontal axis to a driving position from an inoperative position in which said one end is elevated, elevating means on said frame and connected to said other end of said hammer arm for swinging said hammer arm from its driving position to its inoperative position, driving spring means acting between said hammer arm and a portion on said frame, said driving spring means being arranged to be tensioned by movement of said hammer arm from its driving position to its inoperative position, and means for connecting said elevating means to a power take-off for actuating said elevating means and for disconnecting said elevating means from a power take-off so as to free said driving spring means to swing said hammer arm from its inoperative position to its driving position, said elevating means comprising a drum, a cable wound upon said drum and operatively connected with said other end of the hammer arm.

3. In a post driver, a horizontal frame, a hammer arm extending lengthwise of said frame, said hammer arm having a hammer head on one end and having another end, standard means pivotally mounting said hammer arm on said frame to swing said one end downwardly on a horizontal axis to a driving position from an inoperative position in which said one end is elevated, elevating means on said frame and connected to said other end of said hammer arm for swinging said hammer arm from its driving position to its inoperative position, driving spring means acting between said hammer arm and a portion on said frame, said driving spring means being arranged to be tensioned by movement of said hammer arm from its driving position to its inoperative position, and means for connecting said elevating means to a power take-off for actuating said elevating means and for disconnecting said elevating means from a power take-off so as to free said driving spring means to swing said hammer arm from its inoperative position to its driving position, said driving spring means comprising a guide frame pivoted on said horizontal frame to swing on an axis parallel to the axis of swing of said hammer arm, said guide frame comprising a pair of spaced vertical guide members positioned at opposite sides of said hammer arm, a cam roller on said guide frame bearing upon the upper side of said hammer arm and confining said hammer arm between said guide members, and expanding spring means extending between said guide frame and said standard means and arranged to be compressed as said guide frame is swung in a direction toward said standard means through the engagement of said hammer arm with said cam roller as said hammer arm is moved from its driving position toward its inoperative position.

4. In a post driver, a horizontal frame, a fixed standard rising from an intermediate part of said horizontal frame, a hammer arm pivoted intermediate its ends on said standard means to swing on a horizontal axis, said hammer arm having a hammer end and another end, a guide frame rising from said horizontal frame at the hammer end side of said standard, said guide frame being pivoted on said horizontal frame to swing toward and away from said standard, a cam roller on said guide frame rollably engaging the top of said hammer arm at the hammer end thereof, said guide frame thereby being operatively connected to said hammer arm to swing toward said standard as the hammer end of the hammer arm is elevated from a depressed post driving position to an elevated inoperative position, driving spring means operatively connected to said guide frame and said standard so as to be tensioned between said guide frame and said standard as the hammer end of said hammer arm is elevated from its depressed post driving position, and releasable elevating means on said horizontal frame connectible with said other end of the hammer arm for elevating the hammer arm from its post driving position to its elevated inoperative position against the tension of said driving spring means and disconnectible from said hammer arm so as to free said driving spring means to swing the hammer arm to its post driving position.

5. In a post driver, a horizontal frame, a fixed standard rising from an intermediate part of said horizontal frame, a hammer arm pivoted intermediate its ends on said standard means to swing on a horizontal axis, said hammer arm having a hammer end and another end, a guide frame rising from said horizontal frame at the hammer end side of said standard, said guide frame being pivoted on said horizontal frame to swing toward and away from said standard, a cam roller on said guide frame rollably engaging the top of said hammer arm at the hammer end thereof, said guide frame thereby being operatively connected to said hammer arm to swing toward said standard as the hammer end of the hammer arm is elevated from a depressed post driving position to an elevated inoperative position, driving spring means operatively connected to said guide frame and said standard so as to be tensioned between said guide frame and said standard as the hammer end of said hammer arm is elevated from its depressed post driving position, and releasable elevating means on said horizontal frame connectible with said other end of the hammer arm for elevating the hammer arm from its post driving position to its elevated inoperative position against the tension of said driving spring means and disconnectible from said hammer arm so as to free said driving spring means to swing the hammer arm to its post driving position, said releasable elevating means including clutch means arranged to be operatively connected to a power take-off.

6. In a post driver, a horizontal frame, a fixed standard rising from an intermediate part of said horizontal frame, a hammer arm pivoted intermediate its ends on said standard means to swing on a horizontal axis, said hammer arm having a hammer end and another end, a guide frame rising from said horizontal frame at the hammer end side of said standard, said guide frame being pivoted on said horizontal frame to swing toward and away from said standard, a cam roller on said guide frame rollably engaging the top of said hammer arm at the hammer end thereof, said guide frame thereby being operatively connected to said hammer arm to swing toward said standard as the hammer end of the hammer arm is elevated from a depressed post driving position to an elevated inoperative position, driving spring means operatively connected to said guide frame and said standard so as to be tensioned between said guide frame and said standard as the hammer end of said hammer arm is elevated from its depressed post driving position, and releasable elevating means on said horizontal frame connectible with said other end of the hammer arm for elevating the hammer arm from its post driving position to its elevated inoperative position against the tension of said driving spring means and disconnectible from said hammer arm so as to free said driving spring means to swing the hammer arm to its post driving position, a tractor having a rear power take-off and a draw-bar, said horizontal frame being removably mounted on said draw-bar, and said releasable elevating means being operatively connected to said power take-off.

References Cited in the file of this patent

UNITED STATES PATENTS

| Number | Name | Date |
|---|---|---|
| 2,568,540 | Chambers | Sept. 18, 1951 |